(12) United States Patent
Penz et al.

(10) Patent No.: US 11,085,553 B2
(45) Date of Patent: Aug. 10, 2021

(54) VALVE ELECTRONICS AND VALVE ARRANGEMENT

(71) Applicant: Robert Bosch GmbH, Stuttgart (DE)

(72) Inventors: Norbert Penz, Lohr (DE); Stephan Schultze, Lohr-Wombach (DE); Theobald Herrmann, Steinfeld (DE); Thomas Inderwies, Frammersbach (DE)

(73) Assignee: Robert Bosch GmbH, Stuttgart (DE)

( * ) Notice: Subject to any disclaimer, the term of this patent is extended or adjusted under 35 U.S.C. 154(b) by 154 days.

(21) Appl. No.: 16/215,071

(22) Filed: Dec. 10, 2018

(65) Prior Publication Data
US 2019/0178415 A1    Jun. 13, 2019

(30) Foreign Application Priority Data

Dec. 12, 2017    (DE) ...................... 10 2017 222 463.0

(51) Int. Cl.
*F16K 37/00*    (2006.01)

(52) U.S. Cl.
CPC ........ *F16K 37/0041* (2013.01); *F16K 37/005* (2013.01); *F16K 37/0083* (2013.01); *F16K 37/0091* (2013.01)

(58) Field of Classification Search
CPC ............. F16K 37/0041; F16K 37/0091; F16K 37/005; F16K 37/0083
USPC ...... 251/129.01–129.22; 137/624.11, 624.12
See application file for complete search history.

(56) References Cited

U.S. PATENT DOCUMENTS

| | | | | |
|---|---|---|---|---|
| 4,690,249 A * | 9/1987 | Olson, Jr. | ............... | F16N 29/04 184/6.4 |
| 4,794,309 A * | 12/1988 | Saito | .................... | G05D 3/1445 318/9 |
| 6,354,563 B1 * | 3/2002 | Yoeda | ....................... | F01L 9/04 123/90.11 |
| 6,363,895 B1 * | 4/2002 | Butzmann | ................ | F01L 9/04 123/90.11 |
| 6,901,315 B2 * | 5/2005 | Kockemann | ............ | F15B 21/08 700/275 |
| 7,647,940 B2 * | 1/2010 | Minervini | ........... | F16K 37/0033 137/454.6 |
| 7,881,828 B2 * | 2/2011 | Schmidt | ................ | F15B 21/085 700/282 |
| 8,020,533 B2 * | 9/2011 | Tsuchiya | ............ | F02M 63/0063 123/478 |
| 8,290,631 B2 * | 10/2012 | Sweeney | ............... | F15B 19/005 700/282 |

(Continued)

FOREIGN PATENT DOCUMENTS

| | | |
|---|---|---|
| DE | 195 30 935 A1 | 2/1997 |
| EP | 1 264 110 B1 | 8/2004 |
| EP | 1 761 710 B1 | 3/2009 |

*Primary Examiner* — John Bastianelli
(74) *Attorney, Agent, or Firm* — Maginot, Moore & Beck LLP

(57) ABSTRACT

Valve electronics include a control unit with a diagnostic module. The diagnostic module has a sensing device configured to sense at least one actuation parameter. The diagnostic module also has a diagnosis-forming device that forms a diagnostic parameter from the sensed actuation parameter such that the diagnostic parameter corresponds to a measure for the intensity of use of the valve over a preceding time period.

19 Claims, 2 Drawing Sheets

(56) References Cited

U.S. PATENT DOCUMENTS

| | | | |
|---|---|---|---|
| 8,905,371 B2* | 12/2014 | Penning | F15B 19/005 |
| | | | 251/129.04 |
| 2012/0286179 A1* | 11/2012 | Palmerton | G05B 19/0423 |
| | | | 251/129.04 |
| 2015/0076380 A1* | 3/2015 | Telep | F02M 26/50 |
| | | | 251/129.04 |

* cited by examiner

VALVE ELECTRONICS AND VALVE ARRANGEMENT

This application claims priority under 35 U.S.C. § 119 to patent application no. DE 10 2017 222 463.0, filed on Dec. 12, 2017 in Germany, the disclosure of which is incorporated herein by reference in its entirety.

BACKGROUND

The disclosure relates to a valve arrangement having a valve with at least one activation magnet which is arranged on the valve, for activating a piston of the valve, and having valve electronics comprising an amplifier unit for making available an activation current for the activation magnet, and comprising a control unit which actuates the amplifier unit using at least one actuation parameter.

Such a valve arrangement having an electric activation magnet with a position encoder and actuation electronics as an actuating unit for proportional valves is known from DE 195 30 935 A1. The actuation electronics are arranged in a separate housing which is secured to the housing of the valve. A closed-loop controller in the valve electronics is provided, which controller ensures that the piston follows a position setpoint value which is fed to the valve electronics as an electrical input variable, for example, in the form of a voltage or a current.

The position of the valve piston determines the size of the passage cross section of the valve. The inflow of pressure medium to or from an actuator, for example a hydraulic cylinder, is controlled with such valve arrangements.

EP 1 264 110 B1 describes a device for controlling a hydraulic actuator with an electrically activated valve in which a controller for the movement sequence of the actuator is arranged in the same housing as a closed-loop controller for the position control of the valve piston.

A setpoint signal which corresponds to the percentage stroke of the piston is specified to the valve electronics of a proportional valve. The control unit of the valve electronics forms an actuating value for the amplifier unit from the specified proportional setpoint stroke. The amplifier unit generates the electrical current for an activation magnet, which is an electric proportional magnet. The flow of electrical current through the proportional magnet is generally formed by the duty cycle of a pulse-width modulation process of the supply voltage. The duty cycle gives the ratio of the duration of the pulse with respect to the duration of the period of the periodic sequence of pulses and can assume values between 0% and 100%. The proportional magnet activates the piston of the valve in accordance with the specified percentage stroke. The actual stroke of the piston of the valve will differ from the specified setpoint stroke as a result of external influences such as the temperature etc., as well as a result of flow forces acting on the valve piston.

In order to reduce the error between the setpoint stroke and the actual stroke of the piston, the control unit of a proportional valve frequently has a closed-loop control unit. In this case, a position encoder for sensing the position of the piston is added to the valve. The actual stroke of the piston is sensed with the position encoder. The closed-loop control unit forms a position control circuit which adjusts the actual stroke of the valve piston to track the predefined setpoint stroke, according to a control algorithm which is not described here in more detail. The closed-loop control unit of the control unit of the valve electronics can be embodied either in an analog or digital form.

The flow of current through a switching magnet is conventionally generated by applying a constant switching voltage to the connections of the coil of the switching magnet. EP 1 761 710 A1 describes a bus module for connecting electrically actuated hydraulic switching valves to a data bus with an electronic switching arrangement which evaluates address data and useful data from data telegrams which are transmitted to the data bus, and which switching arrangement actuates, in accordance with the useful data of the data telegram, the hydraulic switching valve which is determined by the address data. An electronically controlled switch briefly generates a pull-in current for the activation magnet of the hydraulic switching valve. After the activation of the piston of the valve into the specified switched position by the activation magnet, which is embodied as a switching magnet, the electronically controlled switch generates, by means of pulse-width modulation (PWM), a holding current which is reduced in comparison with the pull-in current.

Valve arrangements having such valve electronics are available in a variety of forms both as external and as integrated valve electronics, wherein the trend is toward integrated valve electronics with microcontroller-based design of the control unit. Like other electrical and mechanical components, such valve arrangements are also subject during use to operationally induced wear which, under certain circumstances, causes the failure or a malfunction of the valve arrangement. If such a valve arrangement fails suddenly and without prior warning, a machine or an installation which contains such valve arrangements can suddenly fail. This generally gives rise to high costs. The object of the present disclosure is to detect and indicate early, and in the most efficient way possible, wear or an imminent malfunction of the valve arrangement, with the result that the operator of the machine or of the installation can take the corresponding necessary preventative measures which prevent a failure of the machine or installation.

SUMMARY

This object is achieved by means of valve electronics for actuating a valve which is activated with the activation magnet and has the features specified in the disclosure, or by means of a valve arrangement with a valve having the features specified in the disclosure.

A diagnostic module is added to the control unit of the valve electronics. The diagnostic module has a sensing device for sensing at least one actuation parameter. Such actuation parameters which are sensed in the sensing device can be, for example, the setpoint switched position which is present at a switching valve, the setpoint stroke for the piston position at a proportional valve, the degree of actuation for the amplifier unit, the actual stroke of the piston in a position encoder which is present etc. The diagnostic module furthermore has a diagnosis-forming device. The diagnosis-forming device forms a diagnostic parameter from the actuation parameter sensed with the sensing device, in such a way that said diagnostic parameter corresponds to a measure for the intensity of use of the valve over a preceding time period. In this way, a diagnostic parameter is made available very efficiently by the valve electronics themselves.

The diagnostic module can be embodied as an analog, digital or microcontroller-based piece of switching equipment or as one of the possible combinations.

A number of examples for the formation of diagnostic parameters from sensed actuation parameters are given below, further examples can be found in the description of the figures. The movement of the piston in the interior of the valve constitutes an important criterion for the intensity of use of this valve. During the movement of the piston in the valve, wear of the valve occurs, which is caused by friction. The number of switching processes at switching valves or the summed piston stroke which is covered at proportional valves therefore constitutes a diagnostic parameter, characterizing the wear, for the intensity of use of the valve arrangement over a preceding time period. For this purpose, any switching cycle of the valve arrangement, any setpoint stroke specification and/or the actual stroke of a travel-sensing process of the piston, can be sensed as an actuation parameter which forms the diagnostic parameter and correspondingly evaluated. The sensing of the actuation parameter of the actual current of the amplifier unit is a measure of the force which is required to achieve a specified stroke of the piston. It serves as a diagnostic parameter for increased friction which is characteristic of a defect of the valve.

Furthermore, it is also possible to carry out, in addition to statistically sensed actuation parameters, an evaluation of the system behavior in the case of dynamic excitation, for example in the case of a step in the setpoint value, and to form diagnostic parameters such as the response time and settling period.

The term amplifier unit which is used here is also intended to include an electronic switch for the actuation of a switching magnet. The terms valve electronics and control unit are also intended to include a switching means for actuating a switching valve, for example a bus coupler or a PWM holding current circuit as mentioned at the beginning in conjunction with EP 1 761 710 A1. The formation of diagnostic parameters according to the disclosure is also carried out efficiently in valve electronics of switching valves and advantageously compared to the conventional valves.

A method according to the disclosure serves to form at least one diagnostic parameter using the valve electronics or valve arrangement, wherein at least one actuation parameter is sensed using the control unit of the valve electronics, and wherein said diagnostic parameter is formed using the sensed actuation parameter in such a way that said diagnostic parameter corresponds to a measure for the intensity of use of the valve over a preceding time period.

The implementation of the method in the form of a computer program is also advantageous, since this entails particularly low costs, in particular if a microcontroller which is to be implemented for the control unit of the valve electronics is also used for other tasks and is therefore present in any case. Suitable data carriers for providing the computer program are, in particular, magnetic, optical and electrical memories such as e.g. hard disks, flash memories, EEPROMs, DVDs etc. A download of a program via computer networks (Internet, Intranet etc.) is also possible.

Advantageous developments are the subject matter of the dependent claims.

According to one advantageous development of the disclosure, an electronic circuit of the control unit is used efficiently also to form the diagnostic module. This can be, for example, a commonly used circuit board in the valve electronics. The control unit can advantageously be implemented with the diagnostic module on the same microcontroller. Then, a digital processing device which is present in any case for the control unit—the microcontroller—can be used equally to provide the diagnostic function. A great advantage of the present disclosure is therefore that the diagnostic module uses the same hardware as the control unit of the valve electronics or of the valve arrangement.

Moreover, it is therefore possible in any case for actuation parameters which are generated by the control unit and which are kept available by it or are fed to it from the outside, to be used directly for the diagnostics. Signal paths are short and therefore less susceptible to faults, and interfaces are not needed for sensing or passing on diagnosis-relevant measurement data or raw data to outside the control unit. The control unit with its diagnostic module forms the diagnostic parameter for an intensity of use of the valve itself and only makes this completely calculated and informative value available to a superordinate controller or a maintenance addressee, such as for example a condition monitoring system.

If the functions of the control unit of the valve electronics or the valve arrangement are already implemented on a microcontroller, in one preferred development of the disclosure it is easily possible to implement the diagnostic module as a further software module of the firmware of the valve electronics on the microcontroller of the control unit. The software and firmware in this context can be, in the first instance, software programs which are executed on a microcontroller, or else sequencing logics which are contained in logic modules (e.g. FGPAs). The latter are also often referred to as logicware. If the control unit of the valve electronics or the valve arrangement has an interface to a bus system or a point-to-point interface, the diagnostic parameters can then be read by a superordinate controller. This permits easy access to the diagnostic parameters which can be read, for example, as acyclic parameters of the field bus. For example, a condition monitoring system with the completely calculated and informative values about the intensity of use of the valve can be supplied particularly advantageously.

According to one preferred development, the diagnosis-forming device can have a first comparator device. In this comparator device, a sensed actuator parameter is compared with a threshold value. The comparison result then determines a diagnostic parameter of the diagnostic module. A number of examples are given below of threshold values which can be specified. Further examples will follow in the description of the figures.

On the one hand, for example the sensed setpoint value specification for the setpoint stroke of the piston can be compared with the interval of permissible setpoint value specifications. If, for example, a threshold value which forms a lower end of the interval is undershot, that is to say, for example, a value of 4 mA in the case of a permissible value range of an external analog setpoint value specification of 4 to 20 mA, the diagnostic parameter "cable break setpoint value specification" is formed. On the other hand, for example, the actual stroke can be compared with the expected actual stroke in the case of a specific actuation of an activation magnet of the piston. When a threshold value is exceeded, a diagnostic parameter which indicates jamming of the piston caused by contamination in the fluid, for example by metallic swarf, is formed.

On the other hand, the actuation parameter of the actual stroke of the piston can be monitored for a permissible range in that a lower and/or an upper limit of the actual stroke are/is specified as a threshold value of the comparator device. When the permissible range is exited, a diagnostic parameter which indicates an encoder error is formed. Likewise, the specified setpoint stroke of the piston can be compared with respect to a permissible range with the comparator device, and when the permissible range is exited a diagnostic parameter which indicates faulty actuation can be formed. It is also conceivable for the actual current, generated by the amplifier by means of pulse width modulation, of the activation magnets to be sensed by a measuring resistor in conjunction with an A/D convertor of the control unit and compared in the comparator device with a calculated threshold value which is expected for a specific setpoint stroke or actual stroke. Of course, it is also possible to compare simultaneously, with the first comparator device, a plurality of different actuation parameters, which are sensed by the sensing device, with threshold values and to form corresponding diagnostic parameters. Threshold values for the comparator device can be threshold values which are permanently specified in the diagnostic module.

In one preferred development of the disclosure, the threshold values of the comparator devices are stored in a memory of the control unit or a memory of the diagnostic module. These values which can be specified and which are stored in the memory of the control unit or in the diagnostic module can be determined and stored during the fabrication of the valve arrangement or during the testing of the valve arrangement on a test bench. It is therefore possible, for example, to store an opening point of the valve, measured on the test bench, as a threshold value.

If the threshold value is an expected degree of actuation of the amplifier unit and/or an expected actual current of the amplifier unit for a specified setpoint stroke of the piston and/or an expected switching capacity of the amplifier unit for a specific control task in each case, and wherein the sensed actuation parameter is a degree of actuation of the amplifier unit and/or an actual current of the amplifier unit and/or a switching capacity of the amplifier unit, diagnostic parameters which indicate a malfunction of the valve arrangement can then be formed when the threshold values are exceeded. It is particularly advantageous if these threshold values are not permanently stored in the memory of the control unit or in the memory of the diagnostic module but are instead calculated from a setpoint stroke of the piston by means of a computational rule or using a model from valve mechanics. It is furthermore possible to calculate threshold values for the setpoint pressure at the consumer connections of the valve or for the setpoint position of a connected, actuated consumer, and, when a sensor system is present, to compare said values with the actual values achieved and to form corresponding diagnostic parameters.

It is furthermore advantageous to use an actuation parameter which is sensed at a preceding time, in particular during a first operation or during a calibration operation of the valve arrangement, modified by a permissible change in this actuation parameter, as a threshold value for the comparator device. It is therefore possible to detect changes in the properties of the valve arrangement, in particular in comparison with the time of the first operation or in comparison with a calibration operation of the valve arrangement. The calibration operation usually takes place during the testing of the valve arrangement on a test bench or during servicing.

In one particularly preferred refinement of the disclosure, it is possible to sense, for example, the degree of actuation of the amplifier and/or the actual current of the amplifier which is required to achieve a specific setpoint stroke of the piston, during the first operation or a calibration operation of the valve, to increase said degree of actuation or actual current by an amount equal to a permissible change in the degree of actuation or the actual current and store it as the threshold value for the comparator device in the memory of the control unit or of the diagnostic module. If the threshold value which is formed in this way is exceeded by the currently sensed actuation parameter of the actual current, the diagnostic parameter which is formed therefore indicates that the friction of the piston is too high or that some other defect has occurred.

In a further particularly advantageous refinement of the disclosure, an actuation parameter is sensed repeatedly at regular time intervals. The difference between the currently sensed actuation parameter and the same actuation parameter which was sensed previously is formed, fed to the comparator device and compared with a threshold value. For example, the difference between the actual current which is required to achieve a specified stroke of the piston and the previous, necessary actual current for the same stroke can be formed and compared with a specified threshold value of the diagnostic module. When the threshold value is exceeded, an excessively large change in the actual current has occurred in order to achieve the specified stroke of the piston. This indicates an acute change in the properties of the valve arrangement. It is therefore conceivable to determine a rate of change and compare it with a specified threshold value.

If the diagnosis-forming device has an aggregation device which carries out aggregation of an actuation parameter over a time period, it is possible, for example, by integrating the time as a diagnostic parameter, to form an operating time counter or some other accumulated operating parameters. The term aggregation is to be understood here as comprising weighted or unweighted summing of actuation parameters which are sensed at different times, integration of actuation parameters over, for example, the time and other summing processes of sensed actuation parameters or a relevant actuation time period.

Further or other diagnostic parameters can very advantageously be formed with an aggregation device. It is therefore possible, for example, to form integration of the absolute values of the amounts of travel carried out by the valve piston, that is to say the absolute values of the individual changes in stroke $dh_{valve\ piston}$ of the valve piston.

$$H_{valve\ piston} = \int |dh_{valve\ piston}|$$

This can be done, for example when a position encoder is not present, by integrating the absolute values of the changes in the setpoint stroke, or alternatively or additionally when a position encoder is present, by integrating the absolute values of the changes in the actual stroke of the valve piston. Since a specification between −100% and +100% occurs for the valve stroke, the integration value which is formed is multiplied by the known piston stroke $H_{piston}$.

$$S_{valve}[km] = \frac{H_{valve\ piston}}{100[\%]} * H_{piston} * \frac{[km]}{1000[m]}$$

These so-called "valve kilometers" $S_{valve}$ give, as diagnostic parameters, a very good indication of the intensity of use or the state of wear of the piston of the valve or its guidance in the valve.

In the case of switching valves, the number of switching processes $n_{switching\ operations}$ can easily be summed and multiplied by the stroke per switching process $H_{piston}$, in order to obtain an equivalent diagnostic parameter. Switching valves are generally of simple design. A bus coupler may be present as a type of control unit. (IO-Link and other field buses).

If the control unit of the valve electronics also performs the closed-loop control of an actuated consumer, for example of a hydraulic cylinder, it is possible, by integrating the absolute values of the setpoint changes in position and/or of the actual changes in position of the hydraulic cylinder $ds_{cylinder}$, to form a diagnostic parameter which characterizes, as a "cylinder kilometer" $s_{cylinder}$ the state of wear of the piston rod as well as its guidance and sealing.

It is also possible to specify the actual position of the cylinder as a parameter by means of a superordinate controller via a field bus, with the result that said actuation parameter can be sensed like an actuation parameter with the sensing device of the diagnostic module and evaluated. Without the specification of a position or a measurement, the parameters "cylinder area" $A_{cylinder}$ and "throughflow" $Q_{valve}$ must be known in the diagnosis-forming device in order to calculate the "cylinder kilometer" $s_{cylinder}$.

$$s_{cylinder} = \frac{1}{A_{cylinder}} \int Q_{valve} \, dt * \frac{[km]}{1000[m]}$$

The throughflow of the valve, for example over the control edge of P to A, $Q_{PA}$, can be calculated at known actual pressures $\rho_P$, $\rho_A$ from the setpoint stroke or the actual stroke $h_{piston}$ of the valve at the connections of the valve, in accordance with:

$$Q_{PA} = \frac{h_{valve}}{100[\%]} * \alpha * A_O \sqrt{\frac{2}{\rho} * (p_P - p_A)}$$

These variables (throughflow and pressure difference) can also be specified by means of a superordinate controller via a field bus.

In the case of switching valves, the summed number of switching processes can be multiplied by the known cylinder stroke per switching process, and an equivalent diagnostic parameter "cylinder kilometer" can be formed.

It is of course also possible for a plurality of actuation parameters which are sensed with the sensing device to be multiplied simultaneously in an unweighted or weighted form, i.e. with factors and summed with the aggregation devices, and therefore to form different diagnostic parameters.

In addition, the diagnostic parameters which are formed with the aggregation device can be fed to a second comparator device, which can be used to compare them with a second threshold value. It is therefore possible, for example, to compare the aggregated operating times and/or the "valve kilometers" and/or the "cylinder kilometers" with a threshold value, and when they are exceeded a diagnostic parameter can be formed. It is, of course, also possible to form simultaneously, with the second comparator device, a plurality of actuation parameters which are aggregated by means of the aggregation device and to compare them with threshold values and form corresponding diagnostic parameters.

If the degree of actuation or the actual current of the amplifier unit is aggregated over the time of an activation, this diagnostic parameter which is formed is a measure for the intensity of use of the output stage driver of the amplifier unit. The diagnostic parameter which is formed in this way characterizes, as a so-called "current time area", the intensity of use of the output stage drivers of the amplifier unit for the activation magnets of the valve. If the duration of time periods at which the valve is actuated with a degree of opening in the fine control range, in particular a degree of opening of 1%-5%, is aggregated in the aggregation device, the accuracy of the information about an intensity of use of the valve can be increased further. The time period during which the piston of the valve has moved in the opening range of the valve is relevant for the valve service life and therefore is a characteristic of the intensity of use of the valve. If the piston moves in the opening range of the valve, namely contamination of the fluid and a comparatively large pressure gradient at the control edges of the piston bring about increased wear of the piston or in the housing. When the actuation parameter "setpoint stroke or actual stroke of the valve body" is known and the actuation parameter "opening range of the valve" or the fine control range is known, this characterizing diagnostic parameter can be formed by integrating the time period during which the actual stroke of the valve was located within the opening range.

If the pressures in the connections of the valve are known or if the actual pressures are sensed, for example by inserting an intermediate plate with pressure transducers, or if the actual pressures in the connections of the valve are specified as parameters by means of a superordinate controller via a field bus, it is possible to integrate and/or aggregate the pressure difference, present between a working connection and P or T, over the time in the aggregation device, and therefore to form a diagnostic parameter "pressure gradient*time" for the respective control edge of the valve. This diagnostic parameter which is formed can be considered to be a measure of the wear of the control edges and therefore of the intensity of use of the control edges of the valve. This diagnostic parameter can be compared with a threshold value by the comparator device and can form a further diagnostic parameter.

Since the pressure gradient at the opening point becomes smaller as a result of rounding of the control edge in the case of a high intensity of use of the valve, a diagnostic parameter "pressure gradient at the opening point" can also be formed and compared with a threshold value.

If the threshold values of the comparator devices are specified by means of a superordinate controller via a field bus or a point-to-point interface, the threshold values can be written into the memory of the diagnostic module during the testing of the valve on a test bench. However, they can also be adapted during use in the field by a superordinate controller or during servicing.

In one particularly advantageous refinement of the disclosure, the valve electronics are mounted on the valve or on the activation magnet of the valve or on a position encoder for the actual stroke of the piston of the valve. This permits a particularly compact and space-saving design of the valve arrangement. The signal paths for the actuation parameters to be sensed are then short and less susceptible to faults. Alternatively or additionally, further sensors such as, for example, an acceleration encoder and/or a temperature sensor are/is arranged on the valve or on the activation magnet of the valve or on a position encoder for the actual stroke of the piston of the valve or in the valve electronics.

The acceleration measured value of the acceleration encoder and/or the temperature measured value of the temperature sensor are/is sensed by the sensing device and serve to form diagnostic parameters, form further diagnostic parameters by comparison with threshold values of a comparator device and/or serve for weighting aggregated sensed parameters in an aggregation device.

With the diagnostic parameters which are formed using temperature measured values or acceleration measured values it is possible, inter alia, to obtain evidence of operation of the valve arrangement which is not in accordance with specifications. Such diagnostic parameters are, for example, the operation of the valve arrangement in an impermissible temperature range or impermissible vibrations during the operation of the valve arrangement.

BRIEF DESCRIPTION OF THE DRAWINGS

The disclosure will be described in more detail below by means of the exemplary embodiment and with reference to the figures, of which.

DETAILED DESCRIPTION

Figure 1:
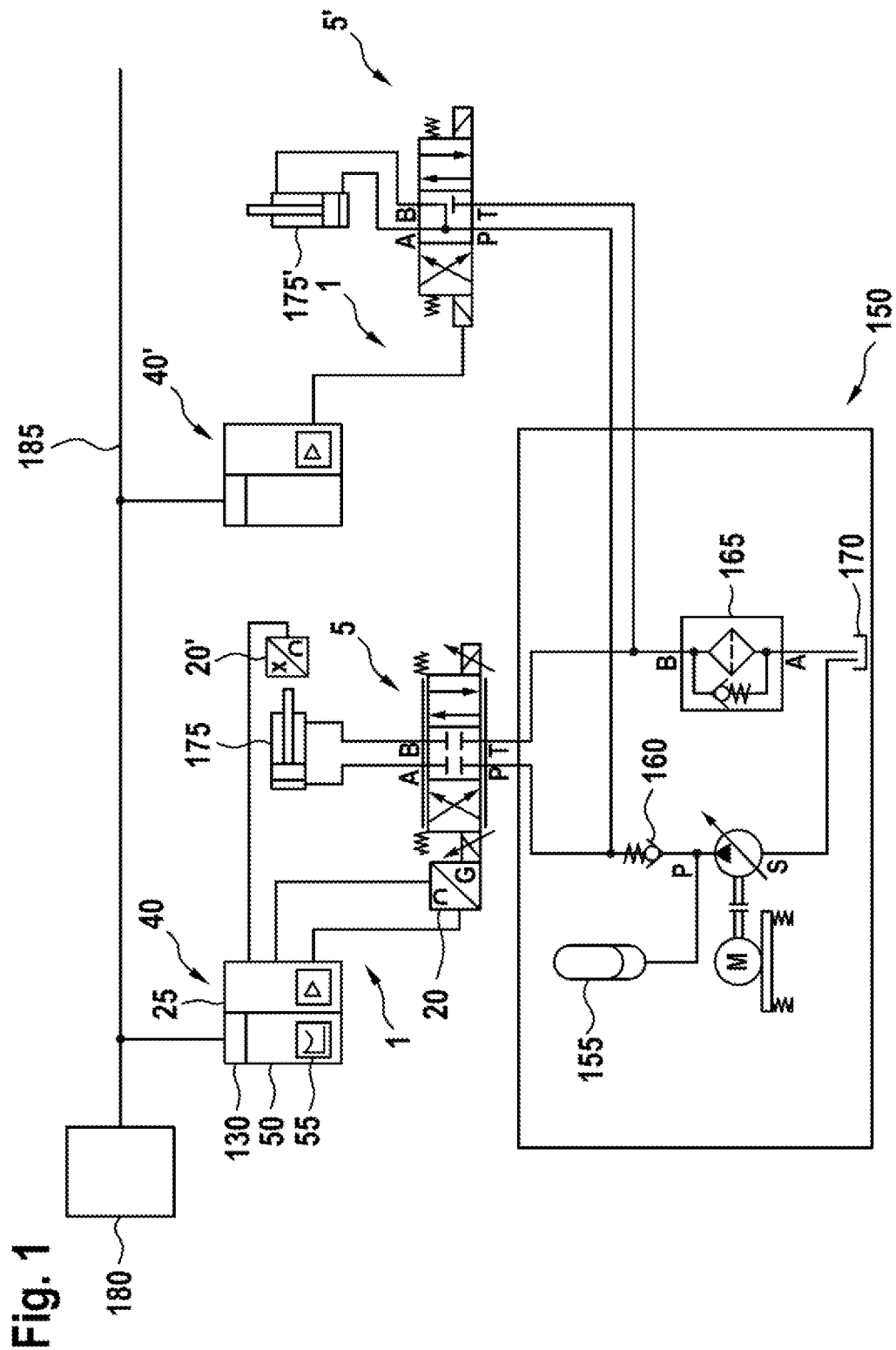
FIG. 1 shows a hydraulic circuit with a proportional valve and a switching valve, which are connected to a superordinate controller via a field bus.

FIG. 1 shows a hydraulic circuit with a hydraulic assembly 150 for supplying pressurized oil to a proportional valve 5 which actuates a working cylinder 175 of a machine, and to a switching valve 5' which actuates a handling cylinder 175' of the same machine. The valves 5 and 5' together with their valve electronics 40 and 40' are each referred to as valve arrangement 1.

The pressure line of the assembly 150 is connected to the connection P of the proportional valve 5 and to the connection P of the switching valve 5'. In order to reduce pressure drops, caused by the working cylinder 175 and handling cylinder 175' consumers, and pressure pulsations, caused by the pump, the assembly 150 is expanded with a bubble memory 155 and a non-return valve 160. The connection T of the proportional valve 5 and the connection T of the switching valve 5' is connected to the container 170 of the assembly 150 via a return filter with a parallel bypass valve 165.

The valve electronics 40 for actuating the proportional valve 5 have a field bus connection 130. The actual stroke of the piston of the proportional valve 5 is sensed with a position encoder 20. The actual position of the working cylinder 175 is sensed with a position encoder 20' and fed to the valve electronics 40 of the proportional valve 5. The actual position of the position encoder 20 of the working cylinder 175 can alternatively also be transferred via a field bus 185 to the field bus connection 130 of the valve electronics 40 of the proportional valve 5. The valve electronics 40 of the proportional valve 5 have a control unit 50 and an amplifier unit 25.

The valve electronics 40 and a bus coupler 40' for actuating the switching valve 5' are connected via a field bus 185 and to a superordinate controller 180. The bus coupler 40' is also considered below to be valve electronics of the switching valve 5'. Examples of field buses 185 are Profibus, Interbus, DeviceNet, Profinet, Sercos III, IO-Link etc. The valve electronics 40, 40' can also be IO-Link devices.

The control unit of the valve electronics 40 of the proportional valve 5 performs closed-loop control of the position of the working cylinder 175 according to a specified setpoint position which is received as a specified value by the superordinate controller 180 via the field bus 185 on the field bus connection 130 of the valve electronics 40.

A closed-loop control unit 55 of the control unit 50 of the valve electronics 40 calculates a setpoint stroke for the piston of the proportional valve 5 from the difference between the setpoint position and the actual position, sensed with the position encoder 20', of the working cylinder 175.

The bus module 40', which can be a bus coupler or a PWM holding current circuit as mentioned at the beginning in conjunction with EP 1 761 710 A1, actuates the switching valve 5'. The switched position of the switching valve 5' is specified by the superordinate controller 180 via the field bus 185. In this context, a microcontroller which is provided in the bus module 40' can be considered to be a control unit 50 which generates a switching signal for the switching valve 5' as a function of a command which is addressed to the bus module 40', and a power electronic switch, which connects a switching magnet of the switching valve 5' to a power source, can be considered, in a way analogous to the valve electronics 40 of the proportional valve 5, to be an amplifier unit 25. The exemplary embodiment is described in more detail below.

Figure 2:
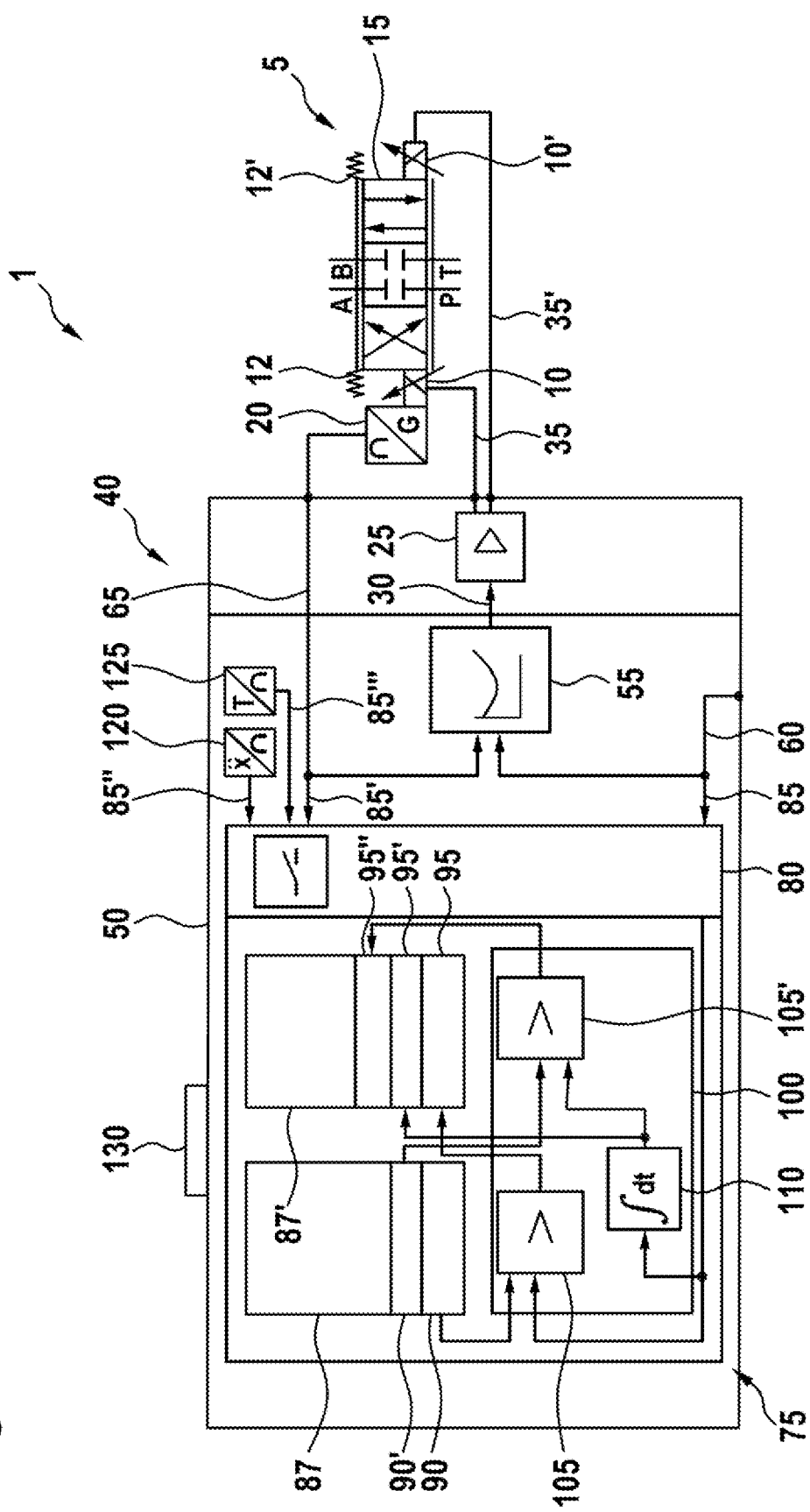
FIG. 2 shows a design of the valve arrangement according to the disclosure using microcontroller-based valve electronics.

FIG. 2 shows a design of the valve arrangement 1 according to the disclosure which, as stated, is composed of valve electronics 40 and a proportional valve 5. The valve electronics 40 is divided into a control unit 50 and an amplifier unit 25 as well as a field bus connection 130. The control unit 50 and the amplifier unit 25 as well as the field bus connection 130 are combined in a common housing of the valve electronics 40, usually even on a common circuit board.

The microcontroller-based control unit 50 is composed of a closed-loop control unit 55 and a diagnostic module 75. The diagnostic module 75 comprises a sensing device 80 and a diagnosis-forming device 100 and has a memory area for threshold values 87 and a memory area for diagnostic parameters 87'. The diagnosis-forming device 100 contains comparator devices 105, 105' and an aggregation device 110. For the sake of clarity, only one aggregation device 110 and two comparator devices 105, 105' are illustrated here. Of course, within the scope of the memory size of the microcontroller, any desired number of sensing devices 80 and/or aggregation devices 110 and/or comparator devices 105, 105' may be present in the diagnostic module 75.

The control unit 50 usually has a microcontroller on which a field bus interface driver of the field bus connection 130, the closed-loop control unit 55 and the diagnostic module 75 are implemented as software modules. The software is preferably implemented in an object-oriented fashion. The classes for the diagnostic module 75 correspond to the respective units. The concept of inheriting the object-oriented programming can advantageously be used by virtue of the fact that sensing devices 80, comparator devices 105, 105' or aggregation devices 110 perform specific tasks through derivation. It is therefore possible, for example, for a comparator device 105 to compare with respect to a threshold value 90, and a derived comparator device 105 monitors a permissible range using two threshold values 90, 90', wherein one threshold value 90 specifies the lower limit, and a second threshold value 50' specifies the upper limit of the permissible range. An aggregation device 110 can sum, for example, a sensed variable, and a derived aggregation device 110 can weight a sensed variable and/or carry out integration over time. A sensing device 80 senses actuation parameters 85, and a derived sensing device 80 weights the actuation parameters 85 during the sensing. The corresponding derived objects are stored in the memory of the microcontroller by instantiation. Of course, the software for the modules can also be produced in procedural programming languages. The proportional valve 5 has four hydraulic connections, P, A, B and T. In order to activate its valve slider—also referred to as a piston 15—in the desired stroke position, the valve 5 has two proportional activation magnets 10, 10' which are actuated by the amplifier unit 25 with an actual current 35, 35'. A position encoder 20 is used to sense the actual stroke 65 of the piston 15.

The setpoint stroke 60 for the piston 15 of the proportional valve 5 is specified as an input of the valve electronics 40. The setpoint stroke 60 generally has a value between −100% and +100%. The setpoint stroke 60 is specified as an analog current, for example 4 to 20 mA, or analog voltage, for example between −10 volt and +10 volt. Alternatively, a digital specification can be made via the field bus connection 130 or via a point-to-point interface, for example an IO-Link interface, as a digital value between −100% and +100%. The setpoint stroke 60 is present at an input of the closed-loop controller unit 55 and as an actuator parameter 85 at an input of the sensing device 80. The output of the amplifier unit 25 of the valve electronics 40 is electrically connected to the activation magnets 10, 10' of the valve 5. The output of the position encoder 20 for the actual stroke 65 of the piston 15 of the valve 5 is electrically connected to an input of the valve electronics 40 and is present at the second input of the closed-loop control unit 55 and as an actuator parameter 85' at a further input of the sensing device 80. A degree of actuation 30 for the amplifier unit 25 is calculated from the difference between the setpoint stroke 60 and the actual stroke 65 in the closed-loop controller unit 55 according to a control algorithm (not described here). The degree of actuation 30 assumes values between −100% and +100% and is also fed to the sensing device 80 as an actuation parameter (not illustrated).

The amplifier unit 25 generates a pulse-width modulated (PWM) voltage signal which serves to actuate the activation magnets 10, 10' of the piston 15 of the proportional valve 5. The actual current 35, 35', whose magnitude is determined by the duty cycle of the PWM signal, is obtained jointly from the inductance L and resistance R of the respective activation magnet 10, 10'. The actual current 35, 35' is converted into a proportional force by the activation magnet 10, 10'. This force which is caused by the magnetic field of the coil of the activation magnets 10, 10' shifts the piston 15 counter to a spring 12, 12' until equilibrium occurs between the spring force and the force of the activation magnet 10, 10'.

If a positive degree of actuation 30 is present at the input of the amplifier 25, the actual current 35' flows through the activation magnet 10'. A deflection of the piston 15 to the left, which is proportional to the magnitude of the actual current 35', occurs, and there is a volume flow from the connection P to the consumer connection A of the proportional valve 5, as well as a volume flow from the consumer connection B to the connection T of the proportional valve 5. If a negative degree of actuation 30 is present at the input of the amplifier 25, the actual current 35 flows through the activation magnet 10. A deflection of the activation magnet 10 of the piston 15 to the right, which is proportional to the magnitude of the actuation current 35, occurs, and therefore a volume flow occurs from the connection P to the consumer connection B of the valve 5, as well as a volume flow from the consumer connection A to the connection T of the valve 5.

Such a valve arrangement 1 can be formed in a particularly compact way if the valve electronics 40 are mounted in a housing on the valve 5 or in a housing on the activation magnet 10, 10' or on the position encoder 20 of the valve 5. The proportional valve 5 and the valve electronics 40 then form one unit. The signal paths for the actual current 35, 35' of the activation magnets 10, 10' of the valve 5 and for the actual stroke 65 of the piston 15 between the proportional valve 5 and the valve electronics 40 are short and less susceptible to faults.

The sensing device 80 of the diagnostic module 75 senses actuation parameters 85 like the setpoint stroke 60 or the actual stroke 65 for the closed-loop control unit 55. Furthermore, as stated, the degree of actuation 30 for the amplifier 25 or the actual current 35, 35', which is output by the amplifier 25, for the activation magnets 10, 10' of the valve 5 can be sensed. It is also possible to sense further actuation signals 85", 85"' such as, for example, the value of an acceleration encoder 120 which is mounted on the valve electronics 40 or on the housing of the proportional valve 5, or the value of a temperature sensor 125. For example, the pressures in the connections of the proportional valve 5 can also be sensed as actuation parameters with the sensing device 80 by means of pressure transducers in an intermediate plate. All these variables can, of course, also be transferred to the sensing device 80 via a field bus 185 or in a wireless fashion, for example via a radio link (e.g. WLAN, Bluetooth etc.), possibly using the superordinate controller 180, and can be sensed at said sensing device 80.

The sensing device 80 can also be programmed in such a way that it weights the actuation parameters. For example, the actual stroke 65 of the piston 15 of the proportional valve 5 can be related to a pressure difference $p_P-p_A$ across the control edge, in order to calculate the throughflow through a control edge, for example from the connection P to the consumer connection A, specifically $Q_{PA}$, of the valve 5.

$$Q_{PA} = \frac{h_{valve}}{100[\%]} * \alpha * A_O \sqrt{\frac{2}{\rho} * (p_P - p_A)}$$

Further actuation parameters which can be sensed with the sensing device 80 are, for example, the setpoint position or the actual position of a hydraulic consumer which is actuated by the proportional valve 5, for example of a hydraulic working cylinder. It is also conceivable to sense the supply voltage for the valve electronics 40 or to sense the current consumption of the valve electronics 40. For the sake of clarity, FIG. 2 only illustrates one sensing device 80 for sensing the actuation parameters of the setpoint stroke 60 and the actual stroke 65. Of course, within the scope of the available memory size of the microcontroller it is possible to instantiate any desired number of objects of the class of the sensing device 80 or derived classes.

Diagnostic parameters 95, 95', 95" which describe the intensity of use of the valve 5 are generated in the diagnosis-forming device 100. These diagnostic parameters 95, 95', 95" can range from a simple operating time counter up to variables which are formed according to complex computational rules and describe the intensity of use of the valve 5 or of the valve arrangement.

In the comparator device 105 of the diagnosis-forming device 100, the actuation parameter, e.g. the setpoint stroke 60 or the sensed actuation parameter of the actual stroke 65, which is sensed with the sensing device 80, is compared with a threshold value 90. The threshold values 90, 90' are stored in a memory area 87 of the diagnostic module 75.

If the threshold value 90, which forms a lower end of the interval, is undershot, that is to say for example a value of 4 mA in a permissible value range of an external analog setpoint value specification of 4 mA to 20 mA, the diagnostic parameter 95 "cable brake setpoint value specification" is formed.

It is also advantageous to check a sensed actuation parameter 85 with a further derived comparator device 105 with respect to a permissible range. If the permissible range is infringed, a corresponding diagnostic parameter 95 is formed. The diagnostic parameter 95 which is formed is stored in a further memory area 87' of the diagnostic module 75.

During the production, in particular during the functional testing of the fabricated valve 5, threshold values 90, 90' for the comparator devices 105, 105' are written into the threshold value memory 87 of the diagnostic module 75 via the field bus connection 130 of the valve electronics 40.

The threshold value 90 can also be an expected degree of actuation 30 of the amplifier unit 25 or an expected actual current 35, 35' of the amplifier unit 25 for a setpoint stroke 60 of the piston, which setpoint stroke 60 is compared with the corresponding sensed actuation parameter of the degree of actuation 30 or the actual current 35 of the amplifier unit 25 with the comparator device 105. When the threshold value 90 is exceeded, a diagnostic parameter 95 is formed which indicates a malfunction of the valve arrangement. This could signal, for example, jamming of the piston 15 caused by contamination of the fluid. If the control unit 50 of the valve electronics 40 performs closed-loop control of the position of an actuated consumer, for example of a working cylinder 175, as illustrated in FIG. 1, the actuation parameter of the actual stroke 65 of the piston 15 can be sensed with the comparator device 80, which actuation parameter is necessary to maintain a specific cylinder position of the working cylinder or a specified pressure. This sensed actuation parameter can be considered to be a measure either of the aging of the proportional valve 5 or of the aging of the system composed of the working cylinder and the proportional valve 5, and a corresponding diagnostic parameter 95 is formed and compared with a threshold value 90. This diagnostic parameter could therefore describe a leak.

Furthermore, it is also possible to carry out, in addition to statically sensed actuation parameters 85, an evaluation of the system behavior during dynamic excitation, for example in the case of a step in the setpoint value. Actuation parameters 85 which are sensed with the sensing device 80 are here the setpoint stroke 60 and the actual stroke 65 of the piston 15. The step response is then the actual stroke 65 of a setpoint stroke 60 step which is specified at the closed-loop control unit 55. In a derived sensing device 80, for example the time is sensed up until the actual stroke 65 reaches a predefined target window, for example >90% of the setpoint stroke. This "settling time" forms a further diagnostic parameter 95 of the diagnostic module 75. In the comparator device 105, the "settling time" is compared with a threshold value 90 and forms a further diagnostic parameter 95. It is also conceivable to sense the control deviation which is present between the setpoint stroke 60 and the actual stroke 65 of the piston 15 after a specified time in the case of a setpoint value step with the sensing device 80 and to form a diagnostic parameter 95 therefrom.

An impermissible operation of the valve electronics 40 is modeled by sensing the acceleration values of the acceleration encoder 120 or of the temperature sensor 125 of the valve electronics 40 and comparing them with lower and upper threshold values 90 of a permissible range in the comparator device 105 with respect to further diagnostic parameters 95. It is furthermore advantageous, when a sensor system is present, to monitor the supply voltage or the current consumption of the valve electronics 40 with respect to a permissible range.

It can be advantageous for threshold values 90 not to be permanently stored in the memory of the diagnostic module 75 but rather to be calculated from a setpoint stroke 60 of the piston by means of a computational rule or using a model of the valve mechanics. It is therefore even possible to calculate threshold values 90 for the setpoint pressure at the consumer connections of the valve 5 or for the setpoint position of a closed actuated consumer, and when a sensor system is present to compare them with actuation parameters 85 which are sensed by the sensing device 80, and to form corresponding diagnostic parameters 95. Threshold values 90 can also be generated in a so-called calibration operation of the valve arrangement 1 by virtue of the fact that actuation parameters 85 which are sensed with the sensing device 80 at the time when the calibration operation is carried out, changed by a permissible change of these actuation parameters 85, are stored as a threshold value 90 for the comparator device 105 in the threshold value memory 87 of the diagnostic module 87. The calibration operation is usually carried out during the testing of the valve arrangement 1 on a test bench or during servicing of the valve arrangement 1.

If an actuation parameter 85 is sensed repeatedly with the sensing device 80 at regular time intervals, it is also possible to calculate a so-called rate of change of an actuation parameter 85 with the sensing device 80. The term rate of change is to be understood here as meaning the difference between the actuation parameter 85 and the same previously sensed actuation parameter divided by the regular time interval. The rate of change is compared with a threshold value 90, a permissible rate of change.

For example, the actual current 35 which is required to achieve a specified setpoint stroke 60 with a piston 15 is sensed repeatedly at regular time intervals. The difference between the currently sensed actual current 35 and the previously sensed actual current 35, that is to say the rate of change of the actual current 35, is fed to the comparator device 105 and compared with a threshold value 90, a permissible rate of change. When the threshold value 90 of the permissible rate of change is exceeded, an excessively large change in the actual current 35 has occurred in order to achieve the same setpoint stroke 60 of the piston 15. This indicates an acute change in the properties of the valve arrangement 1. A corresponding diagnostic parameter 95 is formed.

All the diagnostic parameters 95 can be read via the field bus by means of the field bus connection 130 of the control unit 50 and can be processed further, for example in the superordinate controller 180, or signaled. Monitoring operations can also be carried out in a superordinate controller 180 or a condition monitoring system can be supplied with the completely calculated and informative diagnostic parameters 95 relating to the intensity of use of the valve arrangement 1.

Of course, diagnostic parameters 95 which are formed can also be output by means of digital outputs or displays such as LEDs or seven segment or alpha numeric displays of the valve electronics 40.

The diagnosis-forming device 100 of the diagnostic module 75 also comprises an aggregation device 110. Actuation parameters 85 which are sensed with the sensing device 80, such as the setpoint stroke 60 or the actual stroke 65, are fed to this aggregation device 110. In the aggregation device 110, the absolute values of the changes in stroke $dh_{valve\ piston}$ of the setpoint stroke 60 or of the actual stroke 65 of the piston of the valve are integrated.

$$H_{valve\ piston} = \int |dh_{valve\ piston}|$$

Since a specification between −100% and +100% is specified for the setpoint stroke 60, the integration value which is formed in this way is multiplied by the known piston stroke $H_{piston}$.

$$S_{valve\ piston} = \frac{H_{valve\ piston}}{100[\%]} * H_{piston} * \frac{[km]}{1000\ [m]}$$

These so-called "valve kilometers" $S_{valve\ piston}$ give, as diagnostic parameters 95', a very good indication of the intensity of use or the state of wear of the piston of the valve 5 or its guidance in the valve. However, with the aggregation device 110 it is also possible to sum the number of the switching operations in a switching valve and to multiply them by the piston stroke per switching process $H_{piston}$.

$$S_{valve\ piston} = n_{switching\ operations} * H_{piston} * \frac{[km]}{1000\ [m]}$$

If the control unit 50 of the valve electronics 40 performs open-loop control of the position of an actuated consumer, for example of a working cylinder 175 as illustrated in FIG. 1, the absolute values of the changes in the setpoint position and/or in the actual position $ds_{cylinder}$ of the working cylinder 175 are integrated in order to form a diagnostic parameter 95' "cylinder kilometer" $S_{cylinder}$, which characterizes the state of wear of the piston rod of the working cylinder 175 and the guidance and sealing thereof.

$$S_{cylinder} = \int |ds_{cylinder}| * \frac{[km]}{1000\ [m]}$$

It is also possible to specify the actual position of the working cylinder 175 as a parameter by means of a superordinate controller 180 via a field bus 185, with the result that said actual position can be sensed and evaluated like an actuation parameter with the sensing device 80 of the diagnostic module 75.

Without specification of a position or measurement, the parameters of the "cylinder area" $A_{cylinder}$ and "through-flow" $Q_{valve}$ must be known in the diagnosis-forming device 100 in order to calculate the diagnostic parameter 95' of the "cylinder kilometer" $S_{cylinder}$.

$$S_{cylinder} = \frac{1}{A_{cylinder}} \int Q_{valve}\ dt * \frac{[km]}{1000[m]}$$

When actual pressures across the respective control edge of the valve 5 are known, the throughflow can be calculated from the setpoint stroke 60 or the actual stroke 65 of the valve 5 according to:

$$Q_{PA} = \frac{h_{valve}}{100[\%]} * \alpha * A_O \sqrt{\frac{2}{\rho} * (p_P - p_A)}$$

These variables (throughflow and pressure difference) can also be specified by means of a superordinate controller 180 via a field bus 185 and sensed with the sensing device 80.

Furthermore, it is possible to form further diagnostic parameters 95', such as for example a diagnostic parameter of "operating hours" in that the time period for which the valve electronics 40 are operational, is summed, or to form a diagnostic parameter 95' "current time area" in that the degree of actuation 30 or the actual current 35 of the amplifier unit 25 is integrated over the time of an activation.

If the aggregation device 110 integrates the duration of time periods at which the proportional valve 5 is actuated with a degree of opening in the fine control range, in particular a degree of opening of 1%-5%, the accuracy of the information about an intensity of use of the valve 5 can be improved further. The total time during which the piston 15 of the valve 5 has moved in the window of the opening range of the valve 5 is relevant for the valve service life and is therefore a characteristic of the intensity of use of the valve 5. If the piston moves in the opening range of the valve 5, namely contamination of the fluid and a comparatively high pressure gradient at the control edges of the piston 15 bring about increased wear of the control edges of the piston 15 or in the housing. In the case of known actuation parameters of the setpoint stroke 60 or the actual stroke 65 of the valve body 15 and the known actuation parameter of the "opening range of the valve"/"fine control range", this characterizing diagnostic parameter 95 can be formed by integrating the time period during which the actual stroke of the piston 15 was located within the opening range of the valve 5.

If the pressures in the connections of the valve 5 are known or if the actual pressures are sensed, for example by inserting an intermediate plate with pressure transducers into the hydraulic circuit or specifying the actual pressures in the connections of the valve 5 as parameters by means of a superordinate controller 180 via the control bus 185, it is possible to integrate over time the pressure difference present between a consumer connection and P or T, in the aggregation device 110, and therefore to form a diagnostic parameter 95' "pressure gradient*time" for the respective control edge of the valve 5. This diagnostic parameter 95' which is formed can be considered to be a measure for the wear of the control edge and therefore the intensity of use of the control edges of the valve 5.

Of course, it is possible to sum a plurality of actuation parameters 85 simultaneously in parallel in an unweighted or weighted form with aggregation devices 110, and therefore to form further diagnostic parameters 95'.

The diagnostic parameter 95' "valve kilometer" which is formed by the aggregation device 110 is compared with the threshold value 90' by means of the second comparator device 105'. When the threshold value 90' is exceeded, a diagnostic parameter 95" is formed. Furthermore, it is, for example, possible, when a threshold value 90' for the service life is exceeded, to form a diagnostic parameter 95" for the exchange or necessary maintenance or checking of the valve arrangement 1.

A further possible diagnostic parameter 95" is the "pressure gradient at the opening point". The threshold value 90' for this diagnostic parameter 95" is formed during a first operation or calibration operation of the valve arrangement 1 in that the sensed actuation parameter 85, changed by a permissible change of this actuation parameter is formed, as a threshold value 90' for the comparator device 105'. The calibration operation usually takes place during the testing of the valve arrangement 1 on a test bench or during servicing. As a result of rounding of the control edge as a result of operationally induced wear when there is high intensity of use of the valve 5, the diagnostic parameter 95' "pressure gradient at the opening point" will become smaller, and when the threshold value 90' is undershot it forms a diagnostic parameter 95" for necessary maintenance or exchange of the valve arrangement 1.

The threshold values 90, 95' of the comparator devices 105, 105' are written into the memory of the diagnostic module 75 by means of the superordinate controller 180 via the field bus 185 during the testing of the valve 5 on a test bench. However, they can also be adapted during use in the field by the superordinate controller 180 or during servicing or can be calculated using a computational rule or a model of the valve arrangement 1.

As stated and as also already partially explained in the examples, the disclosure also includes the concept of configuring a switching valve 5' with valve electronics 40' and of providing a diagnostic module 75 in a control unit of these valve electronics 40', which diagnostic module 75 senses the relevant actuation parameters of the switching valve and forms diagnostic parameters. As has been explained in detail with reference to the above examples, it is efficiently possible to generate, specifically by adding a diagnostic module to valve electronics 40 of a valve arrangement 1, diagnostic parameters 95, 95', 95" for the valve arrangement 1 which provide information about the intensity of use of the valve arrangement 1. It is therefore easily possible to detect wear or an imminent malfunction of the valve arrangement 1 in good time. The operator of the machine or of the installation can take corresponding preventative measures in order to prevent a failure of the machine or installation.

According to the disclosure, a diagnostic module is added to a control unit of valve electronics. The diagnostic module has a sensing device for sensing at least one actuation parameter. The diagnostic module furthermore has a diagnosis-forming device. The diagnosis-forming device forms a diagnostic parameter from the actuation parameters sensed with the sensing device, such that said diagnostic parameter corresponds to a measure for the intensity of use of the valve over a preceding time period.

LIST OF REFERENCE NUMBERS

1 Valve arrangement
5, 5' Valve
10, 10' Activation magnet
12, 12' Spring
15 Piston
20, 20' Position encoder
25 Amplifier unit
30 Degree of actuation
35, 35' Actual current
40 Valve electronics
50 Control unit
55 Closed-loop control unit
60 Setpoint stroke
65 Actual stroke
75 Diagnostic module
80 Sensing device
85, 85', 85", 85''' Actuation parameter
87, 87' Memory area
90, 90' Threshold value
95, 95', 95" Diagnostic parameter
100 Diagnosis-forming device
105, 105' Comparator device
110 Aggregation device
120 Acceleration encoder
125 Temperature sensor
130 Field bus connection
150 Hydraulic assembly
155 Bubble memory
160 Non-return valve
165 Filter with bypass valve
170 Container
175, 175' Cylinder
180 Controller
185 Field bus List of Symbols Used in Formula

| Symbols in formula | Meaning | Unit |
|---|---|---|
| $H_{valve\,piston}$ | Absolute value of the total changes in the stroke of the valve piston | [%] |
| $dh_{valve\,piston}$ | Change in the stroke of the valve piston | [%] |
| $s_{valve\,piston}$ | Overall distance travelled by the valve piston | [km] |
| $H_{piston}$ | Piston stroke of the valve | [m] |
| $n_{switching\,operations}$ | Overall number of switching processes of the valve | |
| $ds_{cylinder}$ | Change in the stroke of the cylinder piston | [m] |
| $s_{cylinder}$ | Overall distance travelled by the cylinder piston | [km] |
| $A_{cylinder}$ | Area of the cylinder piston | [m²] |
| $Q_{valve}$ | Throughflow of the valve | $\left[\frac{m^3}{s}\right]$ |
| $Q_{PA}$ | Throughflow over the control edge P to A of the valve | $\left[\frac{m^3}{s}\right]$ |
| $h_{valve}$ | Piston stroke of the valve | [%] |
| $\alpha$ | Flow coefficient of the control edge P to A of the valve | |
| $A_O$ | Opening cross section of the control edge P to A of the valve | [m²] |
| $\rho$ | Density of the fluid | $\left[\frac{kg}{m^3}\right]$ |
| $p_P$ | Pressure at the connection P of the valve | $\left[\frac{N}{m^2}\right]$ |
| $p_A$ | Pressure at the connection A of the valve | $\left[\frac{N}{m^2}\right]$ |

What is claimed is:

1. Valve electronics for actuating a piston of a valve that is activated with an activation magnet, comprising:
an amplifier unit configured to make available an activation current for the activation magnet; and
a control unit that actuates the amplifier unit using at least one actuation parameter, the control unit having a diagnostic module that has a sensing device configured to sense the at least one actuation parameter and a diagnosis-forming device configured to form at least one diagnostic parameter using the sensed actuation parameter,
wherein the diagnostic parameter is formed such that the diagnostic parameter corresponds to a measure for the intensity of use of the valve over a preceding time period, and
wherein the sensed actuation parameter is one or more of (i) a degree of actuation of the amplifier unit, (ii) an actual current of the amplifier unit, and (iii) a switching power of the amplifier unit.

2. The valve electronics according to claim 1, wherein the diagnostic module is implemented together with the control unit in an electronic circuit of the control unit, the electronic circuit configured as a microcontroller.

3. The valve electronics according to claim 2, wherein the diagnostic module is implemented as one or more of a software module on the microcontroller of the control unit and a sequencing logic within a field-programmable gate array (FPGA).

4. The valve electronics according to claim 2, wherein the control unit has an interface to a bus system or a point-to-point interface via which the diagnostic parameter is communicated onto the bus system, the diagnostic parameter being are configured to be read by a superordinate controller.

5. The valve electronics according to claim 1, wherein the diagnostic-forming device has a first comparator device configured to compare the sensed actuation parameter with a first threshold value, and wherein the diagnostic parameter is determined by a result of the first comparator device.

6. The valve electronics according to claim 5, wherein the first threshold value is stored in a memory of the control unit or in a memory of the diagnostic module.

7. The valve electronics according to claim 5, wherein:
the first threshold value is one or more of (i) an expected degree of actuation of the amplifier unit, (ii) an expected actual current of the amplifier unit for a specified setpoint stroke of the piston, and (iii) an expected switching capacity of the amplifier unit for a specific control task in each case.

8. The valve electronics according to claim 5, wherein:
the first threshold value is an expected degree of actuation which is calculated from a setpoint stroke of the piston or a setpoint pressure or a setpoint position of an actuated consumer using a model or a computational rule, and/or is the actual current of the amplifier unit, and
the sensed actuation parameter is one or more of the degree of actuation and the actual current of the amplifier unit.

9. The valve electronics according to claim 5, wherein the first threshold value for the comparator device is an actuation parameter which is sensed at a first time and stored in the diagnostic module, and which is compared with a value of the same actuation parameter which is sensed at a second, later time, and wherein the first threshold value is formed by adding a permissible deviation to the value of the actuation parameter which is sensed at the first time.

10. The valve electronics according to claim 9, wherein the first threshold value is a degree of actuation of the amplifier unit and/or an actual current which is necessary to deflect the piston in accordance with a specified setpoint stroke, sensed at said first time.

11. The valve electronics according to claim 5, wherein:
the sensing device repeatedly senses an actuation parameter at regular time intervals, forms the difference between a sensed actuation parameter and the same actuation parameter which was sensed previously, and the difference is fed to the comparator device and is compared with the first threshold value.

12. The valve electronics according to claim 1, wherein the diagnosis-forming device has at least one aggregation device which carries out, over a certain period of time, aggregation of an actuation parameter which is sensed with the sensing device, and wherein the diagnostic parameter is determined by a result of the aggregation device.

13. The valve electronics according to claim 12, wherein the at least one aggregation device of the diagnosis-forming device aggregates the actuation parameter, the aggregated actuation parameter being one or more of a number of switching processes performed, the absolute value of the differences between the setpoint stroke specifications of the piston, and operating times of the valve electronics or of the valve arrangement.

14. The valve electronics according to claim 12, wherein the actuation parameter which is aggregated by the aggregation device is fed to a second comparator device and is compared with a second threshold value, and wherein a diagnostic parameter is determined by a result of the second comparator device.

15. The valve electronics according to claim 12, wherein the degree of actuation or the actual current of the amplifier unit is aggregated over the time of an activation of the activation magnet.

16. The valve electronics according to claim 12, wherein:
the durations of time periods at which the valve is actuated with a degree of opening in the fine control range are aggregated in the aggregation device, or
a pressure difference which is present at the valve, between a consumer connection and a hydraulic connection of the valve, is aggregated over the time in the aggregation device.

17. The valve electronics according to claim 4, wherein:
the diagnostic-forming device has a first comparator device configured to compare the sensed actuation parameter with a first threshold value, the diagnostic parameter determined by a result of the first comparator device,
the diagnosis-forming device has at least one aggregation device which carries out, over a certain period of time, aggregation of an actuation parameter which is sensed with the sensing device, and the diagnostic parameter is determined by a result of the aggregation device,
the actuation parameter which is aggregated by the aggregation device is fed to a second comparator device and is compared with a second threshold value, and wherein a diagnostic parameter is determined by a result of the second comparator device, and
one or more of the first threshold value and the second threshold value are configured to be received from by the superordinate controller via the interface to the bus system or via the point-to-point interface.

18. A valve arrangement, comprising:
a valve with at least one activation magnet arranged on the valve, for activating a piston of the valve; and
valve electronics including (i) an amplifier unit configured to make available an activation current for the activation magnet and (ii) a control unit that actuates the amplifier unit using at least one actuation parameter,
wherein the control unit has a diagnostic module that has a sensing device configured to sense the at least one actuation parameter and a diagnosis-forming device configured to form at least one diagnostic parameter using the sensed actuation parameter, and
wherein the diagnostic parameter is formed such that the diagnostic parameter corresponds to a measure for the intensity of use of the valve over a preceding time period, and
wherein the sensed actuation parameter is one or more of (i) a degree of actuation of the amplifier unit, (ii) an actual current of the amplifier unit, and (iii) a switching power of the amplifier unit.

19. The valve arrangement according to claim 18, wherein one of:
(i) the valve electronics are attached to the valve or to the activation magnet of the valve or to a position encoder for the actual stroke of the piston of the valve, or (ii) an acceleration encoder is arranged on the valve or on the activation magnet of the valve and/or on a position encoder for the actual stroke of the piston of the valve and/or in the valve electronics, wherein an acceleration measured value of the acceleration encoder is sensed by the sensing device, and wherein the diagnostic parameter is formed using the sensed acceleration measured value.

* * * * *

UNITED STATES PATENT AND TRADEMARK OFFICE
CERTIFICATE OF CORRECTION

Page 1 of 1

PATENT NO. : 11,085,553 B2
APPLICATION NO. : 16/215071
DATED : August 10, 2021
INVENTOR(S) : Penz et al.

It is certified that error appears in the above-identified patent and that said Letters Patent is hereby corrected as shown below:

In the Claims

In Claim 16, at Column 20, Lines 20-21: "a hydraulic connection of the valve, is aggregated" should read --a hydraulic connection of the valve is aggregated--.

In Claim 17, at Column 20, Lines 40-41: "from by the superordinate controller" should read --from the superordinate controller--.

Signed and Sealed this
First Day of March, 2022

Drew Hirshfeld
*Performing the Functions and Duties of the
Under Secretary of Commerce for Intellectual Property and
Director of the United States Patent and Trademark Office*